(12) United States Patent
Guan et al.

(10) Patent No.: US 11,314,731 B2
(45) Date of Patent: *Apr. 26, 2022

(54) MANAGING TRUST POINTS IN LEDGER SYSTEMS

(71) Applicant: ALIPAY (HANGZHOU) INFORMATION TECHNOLOGY CO., LTD., Zhejiang (CN)

(72) Inventors: Yayang Guan, Hangzhou (CN); Xinying Yang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,519

(22) Filed: May 17, 2021

(65) Prior Publication Data
US 2021/0271669 A1 Sep. 2, 2021

Related U.S. Application Data

(63) Continuation of application No. 17/082,727, filed on Oct. 28, 2020, now Pat. No. 11,010,372, which is a
(Continued)

(51) Int. Cl.
*G06F 16/00* (2019.01)
*G06F 16/23* (2019.01)
(Continued)

(52) U.S. Cl.
CPC ...... *G06F 16/2379* (2019.01); *G06F 16/2255* (2019.01); *G06F 16/27* (2019.01); *G06F 21/64* (2013.01)

(58) Field of Classification Search
CPC ... G06F 16/2379; G06F 16/27; G06F 16/2255
See application file for complete search history.

(56) References Cited

U.S. PATENT DOCUMENTS 10,608,829 B1 3/2020 Yoshihama et al.
10,880,105 B1 * 12/2020 Li ..................... H04L 9/321
(Continued)

FOREIGN PATENT DOCUMENTS

CN 104348870 2/2015
CN 106375317 2/2017
(Continued)

OTHER PUBLICATIONS

Extended European Search Report in European Application No. 19849836.2, dated May 31, 2021, 9 pages.
(Continued)

*Primary Examiner* — Khanh B Pham
(74) *Attorney, Agent, or Firm* — Fish & Richardson P.C.

(57) ABSTRACT

Disclosed herein are devices, methods, systems, and apparatus, including computer programs encoded on computer storage media, for managing trust points in ledger systems. One of the methods includes obtaining a request for establishing a trust point for a specified record in a series of records in a ledger system, determining whether the specified record is a candidate trust point that is trustworthy traceable to a preceding trust point, if so, determining whether the specified record is a timestamp record including trust timestamp information from a trust time server, in response to determining the specified record is not a timestamp record, identifying a timestamp record adjacent to the specified record, determining whether the timestamp record is trustworthily traceable to the specified record, and in response to determining the timestamp record is trustworthily traceable to the specified record, marking the timestamp record to be the trust point in the series of records.

20 Claims, 6 Drawing Sheets

Related U.S. Application Data continuation of application No. PCT/CN2019/118143, filed on Nov. 13, 2019.

(51) Int. Cl.
  *G06F 16/27* (2019.01)
  *G06F 16/22* (2019.01)
  *G06F 21/64* (2013.01)

(56) References Cited

U.S. PATENT DOCUMENTS

| | | | |
|---|---|---|---|
| 11,010,372 | B2 | 5/2021 | Guan et al. |
| 2014/0298034 | A1 | 10/2014 | Watanabe et al. |
| 2015/0188715 | A1 | 7/2015 | Castellucci et al. |
| 2018/0150835 | A1 | 5/2018 | Hunt et al. |
| 2019/0215159 | A1 | 7/2019 | Notani |
| 2019/0268162 | A1 | 8/2019 | Sahagun et al. |
| 2020/0076625 | A1 | 3/2020 | Kass |
| 2020/0125269 | A1 | 4/2020 | Karame et al. |
| 2020/0169417 | A1* | 5/2020 | Yang .................. H04L 9/0643 |
| 2020/0169425 | A1* | 5/2020 | Hofstee ............... H04L 63/108 |
| 2020/0174679 | A1* | 6/2020 | Scott .................. G06F 3/0659 |
| 2021/0042296 | A1 | 2/2021 | Guan et al. |
| 2021/0051023 | A1* | 2/2021 | Wei .................... H04L 9/0825 |

FOREIGN PATENT DOCUMENTS

| | | |
|---|---|---|
| CN | 108711056 | 10/2018 |
| CN | 109327528 | 2/2019 |
| CN | 109981673 | 7/2019 |
| EP | 3564884 | 11/2019 |
| KR | 20190000578 | 1/2019 |

OTHER PUBLICATIONS

Haber et al., "How to Time-stamp a Digital Document," Journal of Cryptology, Jan. 1, 1991, pp. 99-111.
Stavrou et al., "Verified Time," IEEE Computer Society, Mar. 2017, 50(3):78-82.
Szalachowski, "Towards More Reliable Bitcoin Timestamps," 2018 Crypto Valley Conference on Blockchain Technology, Mar. 2018, 4 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/118143, dated Mar. 31, 2020, 7 pages.
U.S. Appl. No. 17/082,727, filed Oct. 28, 2020, Yayang Guan.
U.S. Appl. No. 17/322,484, filed May 17, 2021, Yayang Guan.

* cited by examiner

MANAGING TRUST POINTS IN LEDGER SYSTEMS

CROSS-REFERENCE TO RELATED APPLICATIONS

This application is a continuation of and claims the benefit of priority of U.S. patent application Ser. No. 17/082,727, filed Oct. 28, 2020, which is a continuation of PCT Application No. PCT/CN2019/118143, filed on Nov. 13, 2019. The disclosures of the aforementioned applications are hereby incorporated by reference in their entireties.

TECHNICAL FIELD

This specification relates to managing trust points in ledger systems.

BACKGROUND

A ledger is typically used to record a history of transactions, such as economic and financial activities in an organization. Applications with ledger-like functionality, such as custom audit tables or audit trails created in relational databases, have been built to maintain an accurate history of applications' data. However, building such applications is time-consuming and prone to human error. Also, as the relational databases are not inherently immutable, any changes to the data are hard to track and verify.

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. Blockchain networks perform a consensus process to validate each transaction before the transaction can be added to the blockchain networks, which can be time-consuming, ineffective, and complicated.

Therefore, it would be desirable to develop a ledger system that can effectively and securely manage transactions and provide more efficient ways of verifying immutability, reliability, trustworthiness, and traceability of transactions stored in the ledger system.

SUMMARY

Described embodiments of the subject matter can include one or more features, alone or in combination.

For example, in one embodiment, a computer-implemented method includes: obtaining a request for establishing a trust point for a specified record in a series of records stored in a ledger system by a computing device in the ledger system, the trust point indicating that records before the trust point in the series of records are trustworthy; determining whether the specified record is a candidate trust point; in response to determining that the specified record is a candidate trust point, determining whether the specified record is a timestamp record that includes trust timestamp information from a trust time server by the computing device, the trust time server being associated with a trust time authority and independent from the ledger system; in response to determining that the specified record is not a timestamp record, identifying a timestamp record that is adjacent to the specified record among timestamp records in the series of records by the computing device; determining whether the timestamp record is trustworthily traceable to the specified record by the computing device; and in response to determining that the timestamp record is trustworthily traceable to the specified record, marking the timestamp record to be the trust point in the series of records by the computing device.

In some embodiments, one or more of these general and specific embodiments may be implemented using a device, a system, a method, or a computer-readable media, or any combination of devices, systems, methods, and computer-readable media. The foregoing and other described embodiments can each, optionally, include one or more of the following embodiments:

In some embodiments, each record of the series of records includes a respective transaction.

In some embodiments, each record of the series of records includes a respective hash of a preceding record immediately before the record in the series of record.

In some embodiments, determining that the timestamp record is trustworthily traceable to the specified record includes at least one of verifying that the timestamp record comprises information that is traceable to and authenticates the specified record, or verifying the specified record comprises information that is traceable to and authenticates the timestamp record.

In some embodiments, determining that the timestamp record is trustworthily traceable to the specified record includes: verifying that each record from the timestamp record to the specified record in the series of records includes a respective hash of a preceding record immediately before the record.

In some embodiments, determining that the specified record is a candidate trust point includes: verifying that the specified record is trustworthily traceable to a preceding trust point before the specified record in the series of records.

In some embodiments, verifying that the specified record is trustworthily traceable to the preceding trust point before the specified record includes: verifying that each record from the specified record to the preceding trust point in the series of records includes a respective hash of a preceding record immediately before the record.

In some embodiments, the preceding trust point is one of: a trust point immediately before the specified record in the series of records, or a first record that is a source for trust points in the series of records.

In some embodiments, verifying that the specified record is trustworthily traceable to the preceding trust point before the specified record in the series of records includes at least one of: tracing from the specified record back to the preceding trust point in the series of records, or tracing from the preceding trust point forward to the specified record in the series of records.

In some embodiments, receiving a request to verify a to-be-verified record that is after the specified record in the series of records; and determining that the to-be-verified record is verified by verifying that the to-be-verified record is trustworthily traceable to the timestamp record without verifying records preceding the timestamp record in the series of records.

In some embodiments, transmitting a timestamp request to the trust time server; receiving a trust timestamp and associated signature for the timestamp request from the trust time server; and storing the trust timestamp and associated signature as a record in the series of records, where the record storing the trust timestamp and associated signature from the trust time server is a new timestamp record in the series of records, and the new timestamp record is stored immediately after a most recent record stored in the series of records when the timestamp request is transmitted and includes a hash of the most recent record.

In some embodiments, records between the new timestamp record and a preceding timestamp record immediately before the new timestamp record in the series of records are grouped in a unit, and the new timestamp record is included as a last record in the unit.

In some embodiments, the timestamp request includes at least one of: an identifier of the timestamp request among timestamp requests transmitted to the trust time server, an identifier or a hash of the most recent record, or a hash digest of hashes of the records in the unit.

In some embodiments, identifying the timestamp record includes one of: identifying a last record in a unit that includes the specified record to be the timestamp record, and identifying a last record in a preceding unit immediately before the unit that includes the specified record to be the timestamp record.

In some embodiments, the method further includes: determining that a second record in the series of records is a second candidate trust point; determining that the second record is a timestamp record in the series of records; and marking the second record to be the second trust point in the series of records.

In some embodiments, the method further includes: periodically transmitting timestamp requests to the trust time server with a predetermined time period for timestamp request.

In some embodiments, the method further includes: sequentially generating blocks storing the series of records in a blockchain, each of the blocks storing one or more records and being linked together in the blockchain, where generating the blocks in the blockchain is independent from determining that the specified record is the trust point and independent from transmitting a timestamp request to the trust time server.

In some embodiments, determining that the specified record in the series of record stored in the ledger system is the candidate trust point is independent from transmitting timestamp requests to the trust time server.

In some embodiments, the specified record is not marked as the trust point in the series of transactions in response to determining that the specified record is not a timestamp record that includes trust timestamp information from a trust time server.

In some embodiments, each record in the series of records is associated with a respective record identifier, and the series of records are stored in order according to respective record identifiers, and identifying a timestamp record that is adjacent to the specified record among timestamp records in the series of records includes identifying a timestamp record associated with a record identifier that is closest to a record identifier for the specified record in the series of records.

In some embodiments, the new timestamp record includes a hash digest of hashes of the records in the unit.

It is appreciated that methods in accordance with this specification may include any combination of the embodiments described herein. That is, methods in accordance with this specification are not limited to the combinations of embodiments specifically described herein, but also include any combination of the embodiments provided.

The details of one or more embodiments of this specification are set forth in the accompanying drawings and the description below. Other embodiments and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
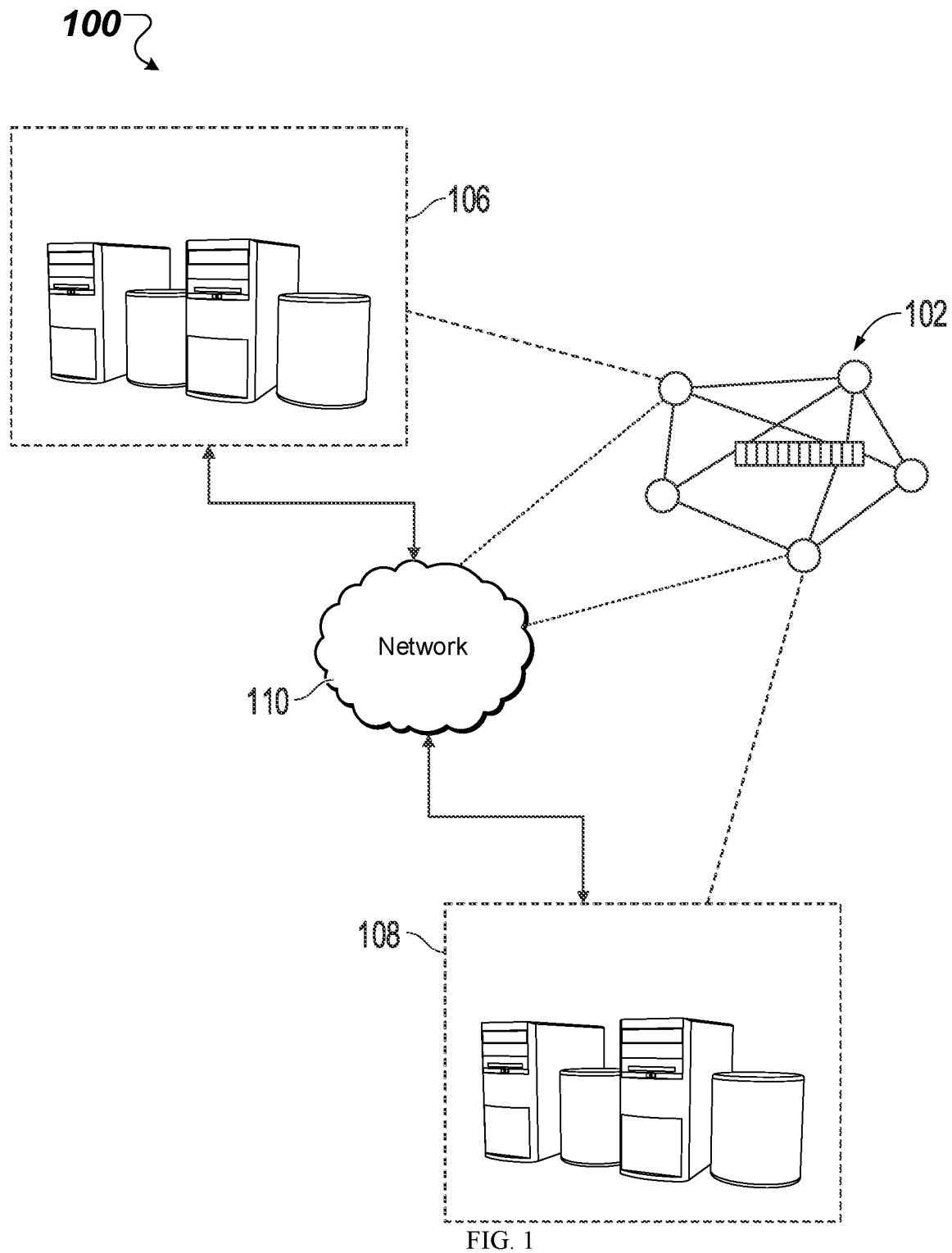
FIG. 1 is a diagram illustrating an example of an environment that can be used to execute embodiments of this specification.

This specification describes technologies for managing trust points in ledger systems. These technologies generally involve a ledger system (e.g., a blockchain-based centralized ledger system) that adopts a data structure of a blockchain and/or a blockchain-like data structure to leverage immutability, reliability, trustworthiness, traceability, and verifiability of data stored in the ledger system. The ledger system can store data as a series of data records (also referred to as records) such as transactions or blocks. In some embodiments, the series of records can be linked or anchored together to prevent unauthorized alteration of the stored data. For example, a record may store a unique identifier (e.g., a respective hash) of a preceding record immediately before the record such that any change of the preceding record will result in a change of the unique identifier, which in turn result in a mismatch to the unique identifier stored in the record. This blockchain-like data structure provides a scheme for verifying trustworthiness of the records stored in the ledger system. For example, trustworthiness of a record can be verified by checking whether all record preceding the record can be trustworthily traced back to the origin or initial record (e.g., a genesis transaction in a ledger system or a genesis block in a blockchain).

As used herein, "A is trustworthily traceable to B" include scenarios where A includes information that is traceable to B and the information authenticates that B has not been altered, or B includes information that is traceable to A and the information authenticates that A has not been altered. For example, A can include a hash of B. The hash of B can be computed, for example, independently by a verifier and compared to the hash stored in A. If the two hashes match, then it can be determined that B is authenticated. Accordingly, A is trustworthily traceable to B. Similarly, A is considered trustworthily traceable to B if B includes a hash or other verifiable information of A that authenticates that A has not been altered. In some embodiments, A trustworthily traceable to B also includes scenarios where A and B are trustworthily traceable to each other via intermediate data. For example, A is considered trustworthily traceable to B if A is trustworthily traceable to C, and C is trustworthily traceable to B. Additional scenarios can be contemplated.

The ledger system can establish trust points among the series of records. For example, a trust point can be a record (e.g., a transaction in a block of a blockchain or a block in a blockchain) among the series of records, indicating that all records stored before the trust point in the series of records are trustworthy. As such, to verify trustworthiness of data stored subsequent to a trust point can be verified by trustworthily tracing to the trust point without the need to trace back to the origin or initial record (e.g., a genesis transaction in a ledger system or a genesis block in a blockchain) or any data preceding the trust point. Accordingly, the verification process can be simplified and computational efficiency can be improved. In some embodiments, the ledger system can obtain trust timestamp information from a trust time server that is independent from the ledger system (e.g., a third-party, globally acknowledged time authority). The ledger system can leverage the established trust on the timestamp information provided by the trust timer server and integrate the trust timestamp information into the ledger system for the stored data and/or the established trust points, which can further enhance credibility, trustworthiness, auditability, and legality of the stored data.

For illustration purposes only, in the present disclosure, a transaction is described as an example of a record.

The techniques described in this specification produce several technical effects. In some embodiments, the ledger system can be a blockchain-based centralized ledger system that can provide a cryptographically verifiable state-independent data ledger storage with time-critical auditing (with non-repudiation and temper-resistance). In some embodiments, the ledger system can provide ledger services based on a cloud platform featuring centralized endorsement with credibility and neutrality. The ledger system can provide highly reliable and high-performance auditable streaming ledger services by leveraging both a blockchain system's high credibility and a centralized system's high performance and low latency for handling various types of data and logs with auditing requirements, traceability, and tracking.

In some embodiments, the ledger system can include a central trusted authority that provides transparent, immutable, and cryptographically verifiable data that are stored in blocks of a blockchain data structure. In some embodiments, the stored data can be in a log format, including, for example, not only for transaction logs but also other transaction data and block data. Due to the existence of the central trusted authority, the ledger system does not need to perform consensus processes to establish trust, which can result in significant time- and cost-savings. In some embodiments, the ledger system can be more efficient compared to a typical blockchain-based distributed or decentralized ledger system. In some embodiments, the ledger system can provide a cloud-based storage service with enhanced trust, efficiency, and storage performance.

In some embodiments, the ledger system can enhance credibility, auditability, and legality of stored data in the ledger system. For example, the ledger system can interface with a trust time server and provide trust timestamp information of the trust time server to clients of the ledger system. The trust time server is independent from the ledger system. The trust time server can be associated with a third-party trust time authority that provides accurate time services and can be acknowledged or trusted, for example, globally, by the public, auditing entities (such as companies, institutions, or organizations), and/or legal entities (such as courts or governments). As the trustworthiness of the timestamp information provided by the trust time server is acknowledged, integrating the timestamp information of the trust time server into the ledger system for the stored data can further enhance credibility, auditability, and legality of the data stored in the ledger system.

In some embodiments, the ledger system features respective rights of parties or participants of the ledger system. For example, a client of the ledger system can have a right of providing a signature for storing transaction data in the ledger system such that the client cannot repudiate the transaction data. In some embodiments, the ledger system has a right of providing a signature for acknowledging the storage of the transaction data such that the ledger system cannot deny storing the transaction data. In some embodiments, a trust time server has a right of providing a signature for trust timestamp information for the transaction data stored on the ledger system such that the trust time server cannot deny the trust timestamp information. In some embodiments, the three respective rights of the three parties (the client, the ledger system, and the trust time server) are independent from each other. The integration of the three rights and their respective non-repudiation and temper-resistance nature can further enhance creditability and auditability of the transaction data stored in the ledger system.

In some embodiments, the ledger system can provide enhanced orderliness and authenticity of transaction data stored in the ledger system. For example, the ledger system can transmit trust timestamp requests for transaction data stored in the ledger system to the trust time server, and the trust time server can provide trust timestamp information such as timestamps and associated signatures, for example, to authenticate or endorse the time of the transaction data. The ledger system can store the trust timestamp information, e.g., as transactions, in the ledger system.

In some embodiments, a transaction storing trust timestamp information from the trust time server can be referred to as a timestamp transaction. In some embodiments, the series of transactions can be linked or anchored together by each transaction storing a respective hash of a preceding transaction immediately before the transaction. The timestamp transaction can also store a hash of a preceding transaction immediately before the timestamp transaction. Thus, the trust timestamp information can be used to verify orderliness and authenticity of the transactions stored in the ledger system, which in turn can provide enhanced creditability, auditability and legality of the transactions stored in the ledger system.

In some embodiments, the ledger system can request trust timestamp information for two or more transactions in a unit that are added into the ledger system after an immediately preceding timestamp transaction. The ledger system can send a timestamp request including information of the transactions, e.g., a hash digest of hashes of the transactions in the unit. After receiving trust timestamp information for the timestamp request, the ledger system can store the trust timestamp information as a new timestamp transaction in the unit that is also the last transaction in the unit. The transactions in the unit can be considered to have the same trust timestamp as the new timestamp transaction. In such a way, the ledger system can reduce an overall cost requesting trust timestamps from the trust time server.

In some embodiments, these technologies described herein can provide enhanced immutability, reliability, trustworthiness, and traceability of data records (e.g., transactions) stored in the ledger system and provide more efficient ways of verifying those security features of the data records. In some embodiments, the ledger system can establish trust points in the series of transactions stored in the ledger system. A trust point indicates that transactions preceding the trust point are trustworthy. When a transaction in the series of transactions is to be verified, the ledger system can identify a nearest trust point preceding the transaction and can determine whether the transaction can be verified by just verifying whether the transaction can be trustworthily traceable to the nearest trust point, without verifying historic transactions such as transactions preceding the nearest trust point. This can greatly enhance transaction verification speed, efficiency, and accuracy in the series of transactions. For example, the ledger system can include a large number of transactions, e.g., 1000 transactions. If there is no trust point established in the large number of transactions, to verify a most recent transaction, e.g., the 1000th transaction, the ledger system has to verify whether the transaction can be trustworthily traceable to an origin or genesis transaction (e.g., the first transaction) by, for example, verifying whether each transaction from the most recent transaction to the original transaction includes a respective hash of a preceding transaction immediately before it. That is, the ledger system has to perform about 1000 times of verifications. However, if the ledger system establishes a number of trust points in the number of transactions, e.g., a trust point per 10 transactions, to verify the most recent transaction, the ledger system can identify the nearest trust point preceding the most recent transaction, e.g., the 990th transaction. Then the ledger system can verify whether the most recent transaction can be trustworthily traced back to the nearest trust point, e.g., the 990th transaction, without verifying historic transactions before the nearest trust point. That is, the ledger system only needs to perform about 10 times of verifications. Thus, the verification computational efficiency can be greatly improved. With much less computations, the verification accuracy can be also increased.

In some embodiments, the described technologies can establish trust points on timestamp transactions that store trust timestamp information from the trust time server. Trust timestamp information offers an additional layer of trust from the trust time server that authenticates timing of the stored data (e.g., transactions) to further prevent unauthorized alteration of the stored data. Accordingly, compared to the trust points without trust timestamp information, the established trust points can have enhanced trust or endorsement based on the timestamp information from the trust time server. If a specified transaction determined to be a trust point is not a timestamp transaction, the ledger system can establish the trust point on a timestamp transaction adjacent to be the specified transaction that can be trustworthily traceable to the specified transaction. If a specified transaction is determined to be a timestamp transaction but not a trust point, the ledger system can identify a timestamp transaction that is adjacent to the specified transaction and trustworthily traceable to a preceding trust point before the timestamp transaction and establish a new trust point on the adjacent timestamp transaction.

In some embodiments, the timestamp transaction can be the last transaction in a unit of transactions including the specified transaction or the last transaction in a preceding unit immediately before the unit including the specified transaction. In such a way, it can be easier and faster to locate an adjacent timestamp transaction for establishing the trust point of the specified transaction. As a result, efficiency and accuracy in verifying credibility, trustworthiness, and legality of transactions stored in the ledger system can be further enhanced.

In some embodiments, the ledger system can establish the specified transaction as a trust point if both conditions are satisfied: (1) the specified transaction is trustworthily traceable to another trust point in the series of transactions, and (2) the specialized transaction is a timestamp transaction that stores trust timestamp information from the trust time server. In some embodiments, the ledger system can first verify the two conditions in either order or in parallel. For example, the ledger system can verify that the specialized transaction is a trust point, for example, by verifying that the specialized transaction can be trustworthily traceable to another trust point, and then determine whether the specified transaction is a timestamp transaction. In some embodiments, the ledger system may first determine whether the specified transaction is a timestamp transaction, and then determine whether the specialized transaction can be trustworthily traceable to another trust point. If the ledger system determines that the specified transaction satisfies one of the two conditions, the ledger system can determine that the specified transaction is a candidate trust point. Only after the ledger system determines that the specified transaction satisfies both of the two conditions, the ledger system can determine that the specified transaction is a trust point.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a hash of the previous block. Each block also includes a local timestamp (e.g., provided by a computing device that generates the block or a computing system that manages the blockchain), its own hash, and one or more transactions. For example, the block can include a block header and a block body. The block header can include the local timestamp, its own hash, and a hash of the previous block. The block body can include payload information such as the one or more transactions (or transaction data). The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

In some embodiments, a centralized ledger system can also adopt the data structure of a blockchain to leverage immutability, reliability, and trustworthiness of data stored on a blockchain. In some embodiments, such a centralized ledger system can be referred to as a blockchain-based centralized ledger system or a universal auditable ledger service system. In some embodiments, the blockchain-based centralized ledger system can include a central trusted authority that provides transparent, immutable, and cryptographically verifiable data that are stored in blocks of a blockchain data structure. The stored data can be in a log format, including, for example, not only for transaction logs but also other transaction data and block data. Due to the existence of the central trusted authority, the blockchain-based centralized ledger system does not need to perform consensus processes to establish trust. In some embodiments, the blockchain-based centralized ledger system can be more efficient compared to a typical blockchain-based distributed or decentralized ledger system. In some embodiments, the blockchain-based centralized ledger system can provide a cloud-based storage service with enhanced trust, efficiency, and storage performance.

In some embodiments, the centralized ledger system can be a node of a blockchain network. For example, the centralized ledger system can be a non-consensus node in the blockchain network and can provide highly reliable and high-performance auditable streaming ledger services for the consensus nodes or other non-consensus nodes in the blockchain network, or entities outside of the blockchain network.

FIG. 1 is a diagram illustrating an example of an environment 100 that can be used to execute embodiments of this specification. In some examples, the environment 100 enables entities to participate in a consortium blockchain network 102. The environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing systems 106, 108 can be nodes of a cloud computing system (not shown), or each of the computing systems 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing systems include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
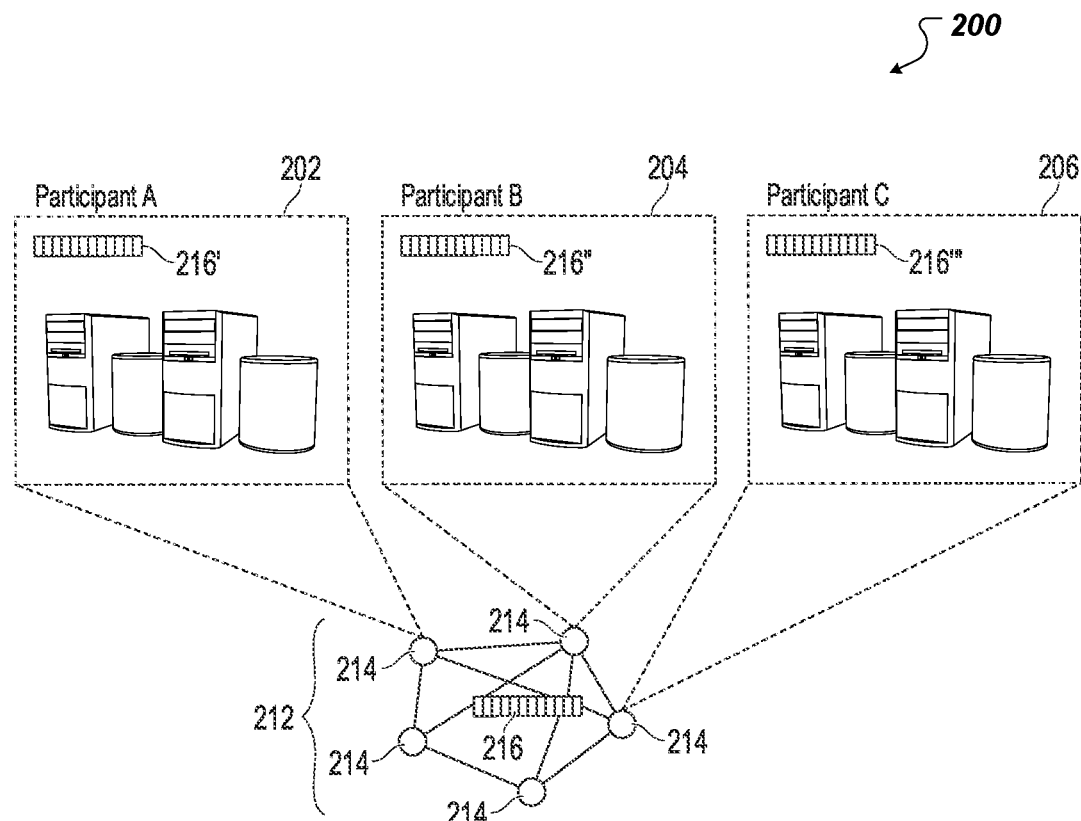
FIG. 2 is a diagram illustrating an example of an architecture in accordance with embodiments of this specification.

FIG. 2 is a diagram illustrating an example of an architecture 200 in accordance with embodiments of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including multiple nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216''' of the blockchain 216.

A blockchain (e.g., the blockchain 216 of FIG. 2) is made up of a chain of blocks, each block storing data. Examples of data include transaction data representative of a transaction between two or more participants. Transaction data is used as an example of data record stored in the blockchain. Examples of a transaction can include, without limitation, exchanges of something of value (e.g., assets, products, services, currency). In some embodiments, one or more operations executed in the ledger system can be stored as transaction data in the blockchain. For example, the transaction data can include one or more operations or manipulations of data stored in the block chain, information (e.g., timestamp information) obtained from an external resource, or any appropriate data can be stored in a blockchain (e.g., documents, images, videos, audio). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
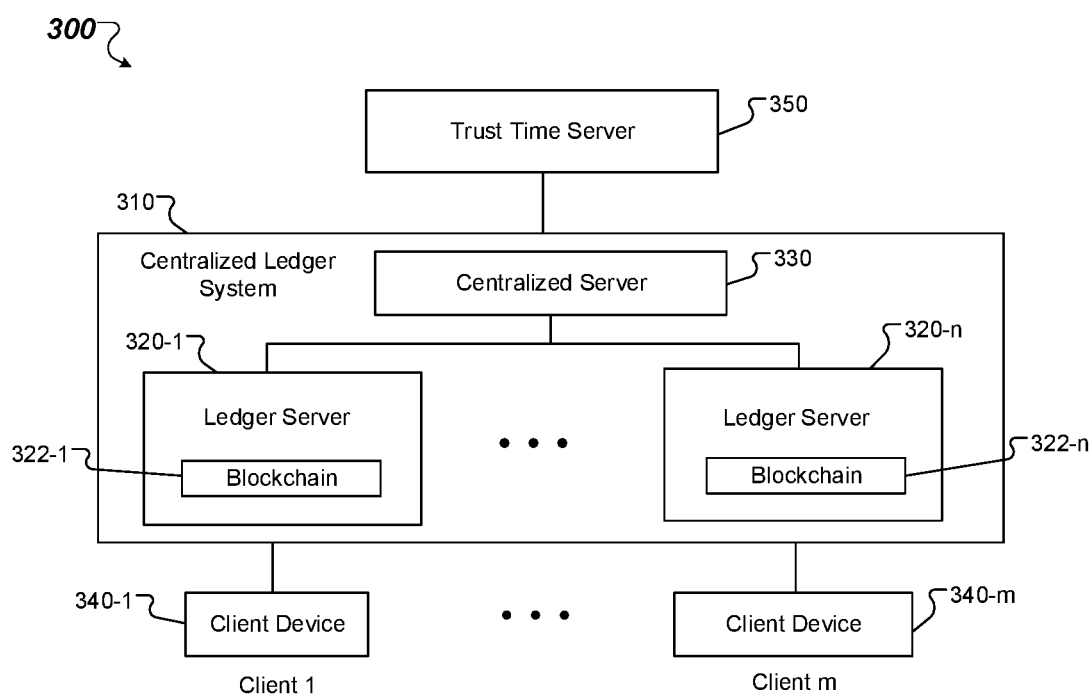
FIG. 3 is a diagram illustrating an example of an environment implementing trust timestamp services in a ledger system in accordance with embodiments of this specification.

FIG. 3 is a diagram illustrating an example of an environment 300 in accordance with embodiments of this specification. The environment 300 implements trust timestamp services in a ledger system 310. For illustration purposes only, a blockchain-based centralized ledger system is described as an example of the ledger system 310. The blockchain-based centralized ledger system 310 adopts a data structure of a blockchain to leverage immutability, reliability, and trustworthiness of data stored on the blockchain. The centralized ledger system 310 can also integrate trust timestamp information from a trust time server 350 that is independent from the centralized ledger system 310 for the data stored on the blockchain, which can greatly enhance credibility, auditability, and legality of the stored data.

In some embodiments, the centralized ledger system 310 can be a cloud computing system including one or more computers interconnected by a network. The centralized ledger system 310 can include any appropriate computing devices. Examples of computing devices include, without limitation, a server, a desktop computer, a laptop computer, a tablet computing device, and a smartphone.

In some examples, the centralized ledger system 310 includes one or more ledger servers 320-1 to 320-n (collectively referred to herein as "320"). Each ledger server 320 can host one or more computer-implemented services for interacting with at least one client, e.g., client 1 or client m. The client can be an individual, a company, an organization, a financial institution, an insurance company, or any other type of entity. In some cases, a client can be associated with one or more ledger servers. In some cases, a ledger server can be associated with one or more clients.

The ledger server 320 can host a transaction management system to provide a ledger service for a client, e.g., client 1 or client m, and the client can use one or more associated devices, e.g., client device 340-1 or 340-m (collectively referred to herein as "340"), to access the transaction management system to use the ledger service. The client device 340 can include any appropriate computing devices.

The ledger service provided by the ledger server 320 can enable a client to store its data in a transparent, immutable, and cryptographically verifiable blockchain data structure, e.g., a blockchain. Each ledger server, e.g., 320-1 or 320-n, can maintain a respective blockchain, e.g., 322-1 to 322-n (collectively referred to herein as "322"). In some embodiments, each ledger server 320 can perform similar functions to those of a blockchain network node (e.g., the computing system 106 or 108 of FIG. 1 or the computing system 202, 204 or 206 of FIG. 2) in a blockchain network. For example, each ledger server 320 can generate blocks and add the blocks to the blockchain 322. In some embodiments, each ledger server 320 can function as a central trusted authority and does not need to perform consensus processes with other nodes (e.g., other client devices or other leger servers) to establish trust. For example, each ledger server 320 can perform similar functions to those of a non-consensus node of a blockchain network. In some embodiments, each ledger server 320 can be the single node that creates and/or manages the blockchain 322.

In some embodiments, each client can be associated with a respective blockchain. In some embodiments, one or more clients can be associated with a same blockchain. In some embodiments, a blockchain can be associated with one or more clients.

In some examples, client 1 is an individual, a company, or an organization. The client device 340-1 associated with client 1 can interact with the ledger server 320-1 to obtain a ledger service of the centralized ledger system 310. For example, the client device 340-1 can access the blockchain 322-1 to read and store transaction data associated with client 1 through the ledger server 320-1. The client device 340-1 can include, for example, any suitable computer, module, server, or computing element programmed to perform methods described herein. In some embodiments, the client device 340-1 can include a user device, such as, a personal computer, a smartphone, a tablet, or other handheld device.

In some examples, client m is an insurance company or a financial institution such as a bank that has a number of individual users. The client device 340-m associated with client m can interact with the ledger server 320-m to provide a ledger service of the centralized ledger system 310 to the individual users of client m. For example, the client device 340-m can access the blockchain 322-m to read and store transaction data associated with client m through the ledger server 320-m. In some cases, a user of client m can request a ledger service of the centralized ledger system 310 through the client device 340-m.

The data stored in a blockchain can be in a log format, including, for example, not only for transaction logs but also other transaction data and block data. Each blockchain stores data in a way that the data is immutable and cannot be altered or deleted. Using cryptography can enable verification that there have been no unintended modification to the stored data. Thus, data recorded on the blockchain are reliable and trustworthy.

The blockchain can include one or more blocks. Each block in the blockchain is linked to a previous block immediately before it in the chain by including a hash of the previous block. Each block also includes a local timestamp, its own hash, and one or more transactions or transaction data. For example, the block can include a block header and a block body. The block header can include the local timestamp, its own hash, and a hash of the previous block. The block body can include payload information such as the one or more transactions or transaction data. The local timestamp indicates a time point or instance when the block is generated and/or added to the blockchain. The local timestamp can be internally provided by the ledger server 320, the centralized ledger system 310, or a central trusted authority associated with the centralized ledger system 310.

In some embodiments, the ledger server 320 sequentially receives a series of transactions associated with a client and then stores the transactions in blocks of a blockchain. In some embodiments, the ledger server 320 can receive one or more transactions, for example, from one or more client devices 340. The received transactions can be stored in a data buffer. The ledger server 320 can generate a block to store the transactions, for example, including transferee and transferor accounts, transaction amounts, or other types of information of the transactions.

In some embodiments, the ledger server 320 can store the transactions in a stream, array, or another data structure (referred to as a transaction storage stream). For example, the transactions can be sequentially stored in the transaction storage stream according to time of occurrence of the transactions. Each transaction can have a respective transaction identifier in the transaction storage stream, for example, according to its time of occurrence. The ledger server 320 can generate blocks to include a number of transactions or a number of hashes for the transactions. In some embodiments, the transactions or the hashes for the transactions can be stored according to the time of occurrence of corresponding transactions, instead of according to values of the hashes. In some embodiments, the hashes for the transactions can be hashes of the transactions or hashes of the respective transaction identifiers of the transactions. A block can include a hash of a previous block immediately before it such that the blocks are anchored with each other to form a blockchain (or a block storage stream). In such a way, the blocks do not store details of the transactions. The details of the transactions can be stored in the transaction storage stream in the ledger server 320 or a separate repository in the centralized ledger system 310.

The ledger server 320 can also provide trust timestamp services to a client. In some embodiments, the ledger server 320 can request trust timestamps from the trust time server 350 for data stored in the ledger server 320, which can enhance credibility, auditability, and legality of the stored data. The trust time server 350 is independent from the centralized ledger system 310. The trust time server 350 can be associated with a third-party trust time authority that provides accurate (or true) time services and can be, for example, globally, acknowledged or trusted by the public, auditing entities (such as companies, institutions, or organizations), and/or legal entities (such as courts or governments). Trust timestamp information provided by the trust time server 350 can be acknowledged or considered as legality without notarization and/or forensic identification. For example, the trust time server 350 can be a UTC (Coordinated Universal Time)/GMT (Greenwich Mean Time) server providing UTC/GMT time services. The trust time server 350 can also be a time server of a trust authority providing standard times for a country or a region.

The centralized ledger system 310 can communicate with the trust time server 350 through a network, e.g., the network 110 of FIG. 1. In response to receiving a timestamp request from a customer, e.g., the ledger server 320, the trust time server 350 can generate a timestamp indicating a time point when receiving the timestamp request. The trust time server 350 can generate a signature to authenticate the timestamp and the timestamp request (e.g., a textual or imaging copy of the timestamp request). For example, the trust time server 350 can use its private key to sign, thus cryptographically encrypting, the timestamp and the timestamp request. The trust time server 350 can generate a digital timestamp certificate including the timestamp and the associated signature and transmit timestamp information including the timestamp certificate to the customer. The trust time server 350 can provide the trust timestamp service with a cost, e.g., $1 per timestamp request.

In some embodiments, the ledger server 320 transmits to the trust time server 350 a timestamp request for authenticating a time of a block in a blockchain. The timestamp request can include information of the block, e.g., a hash of the block. The time server 350 can generate and transmit timestamp information including the timestamp and associated signature for the block or a hash of the timestamp and associated signature. After receiving the timestamp information from the trust time server 350, the ledger server 320 can store the timestamp information or a hash of the timestamp information into a following block immediately subsequent to the block in the blockchain. In some embodiment, the timestamp information can be stored as a transaction in the following block. A block storing the timestamp information can be referred to be a timestamped block. The timestamped block can be a block that includes only the timestamp information, or a block that also include other transactions in addition to the timestamp information. Timestamped blocks in the blockchain can be anchored or linked to each other in the blockchain.

In some embodiment, the ledger server 320 can periodically transmit timestamp requests for to-be-timestamped blocks in a blockchain to the trust time server 350 with a predetermined triggering time period. For example, the ledger server 320 can include a timer counting a time after transmitting a first timestamp request. When the timer counts the predetermined triggering time period, the ledger server 320 can be triggered to transmit a second timestamp request immediately subsequent to the first timestamp request. The centralized ledger system 310 or the ledger server 320 can provide timestamp services with different costs corresponding to different triggering time periods. The triggering time period can be predetermined by a client (or a user) associated with the blockchain or the ledger server 320. For example, the client can choose a timestamp service corresponding to a respective cost and a respective triggering time period.

In some embodiments, the ledger server 320 may not transmit timestamp requests to the trust time server 350 periodically. For example, the ledger server 320 may transmit timestamp requests on demand or based on the number of the blocks generated by the ledger server 320. For example, the ledger server 320 may transmit a timestamp request of a block upon receiving instructions from the client, or upon a predetermined number of blocks have been recently added to the blockchain 322.

In some embodiments, the ledger server 320 may generate blocks periodically at a predetermined time period of block generation. The predetermined triggering time period can be the same or different from the time period of block generation. The predetermined triggering time period can be longer than the time period of block generation so that not every block is being timestamped, for example, due to the cost of obtaining the timestamp from the trust time server 350. In some embodiments, the ledger server 320 may not generate blocks periodically. For example, the ledger server 320 may generate blocks on demand or based on the number of the transactions received by the ledger server 320. For example, the ledger server 320 may generate a new block upon receiving a predetermined number of transactions.

In some embodiment, the ledger server 320 can include one or more application programming interfaces (APIs) that is configured to communicate with the trust time server 350. An API can include a set of subroutine definitions, communication protocols, and tools for building software, and defines functionality provided by a program (module, library) and allows abstraction from exactly how this functionality is implemented. Software components interact with each other through the APIs. In some embodiment, the ledger server 320 can include one or more APIs that can implement functionalities of receiving a hash of a to-be-timestamped block as an input for a timestamp request, transmitting the timestamp request to the trust time server 350, and receiving trust timestamp information, e.g., a digital timestamp certificate or a timestamp and associated signature, sent by the trust time server 350.

The ledger server 320 can include one or more APIs that are configured to communicate with a client device 340 associated with a client. The one or more APIs can implement functionalities such as receiving a request for a timestamp service from the client device 340, listing different timestamp services with different costs and different triggering time periods, receiving a selection among the timestamp services from the client device 340, and transmitting or displaying a corresponding cost with a corresponding triggering time period to the client device 340. In some embodiment, the one or more APIs can also implement functionalities such as receiving a request for verifying or auditing transactions stored on a blockchain associated with the client and transmitting a verification or audition result to the client device 340. As discussed with further details in FIGS. 4A and 4B, the one or more APIs can also implement other functionalities such as receiving transactions or transaction data and client signatures from the client device 340 and transmitting a ledger signature indicating acknowledging the receipt or storage of the transactions or transaction data and/or the client signatures.

In some embodiments, the centralized ledger system 310 includes a centralized server 330. The centralized server 330 can be in communication with the number of ledger servers 320 in the centralized ledger system 310. In some embodiments, the ledger servers 320 communicates with the client devices 340 through the centralized server 330. For example, the centralized server 330 can receive data from a client device 340 and send the data to a ledger server 320 corresponding to (or assigned to) the client device 340.

In some embodiments, the centralized server 330 can maintain a standard time server for the centralized ledger system 310 and can provide internal timestamps (and/or associated signatures) to the ledger servers 320. For example, when a ledger server 320 generates a new block, the ledger server 320 can obtain an internal timestamp (and/or associated signature) from the centralized server 330 and store the internal timestamp (and/or associated signature) in the new block.

In some embodiments, each of the ledger servers 320 communicates with the trust time server 350 through the centralized server 330. For example, the ledger servers 320 can transmit original timestamp requests to the centralized server 330 and the centralized server 330 can transmit the original timestamp requests or centralized server timestamp requests associated with the timestamp requests to the trust time server 350, e.g., through a centralized API in the centralized server 330. The centralized server 330 can provide trust timestamp information obtained from the trust time server 350 to the ledger servers 320. In some other embodiments, as described above, each of the ledger servers 320 can communicate with the trust time server 350 directly without the centralized server 330.

Figure 4A:
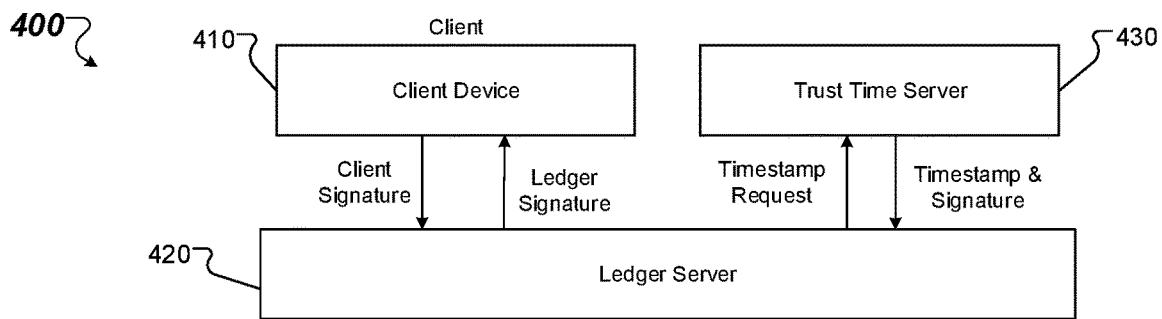
FIG. 4A is a diagram illustrating an example of a ledger system for implementing a trust timestamp service in a single ledger server associated with a single client in accordance with embodiments of this specification.

FIG. 4A is a diagram illustrating an example of a ledger system such as a blockchain-based centralized ledger system 400 for implementing a trust timestamp service in a single ledger server associated with a single client in accordance with embodiments of this specification. The blockchain-based centralized ledger system 400 can include a single ledger server 420 dedicated to provide a ledger service to a single client associated with a client device 410. The blockchain-based centralized ledger system 400 can be an example of the centralized ledger system 310 of FIG. 3. For example, the ledger server 420 can be an example of the ledger server 320-1 of FIG. 3. The client device 410 can be an example of the client device 340-1 of FIG. 3. The client uses the client device 410 to access the ledger service provided by the ledger server 420, in the blockchain-based centralized ledger system 400. The ledger server 420 can also provide a trust timestamp service to the client by communicating with a trust time server 430, which can be, for example, the trust time server 350 of FIG. 3.

The ledger server 420 can provide the ledger service and the trust timestamp service exclusively to the client. The ledger server 420 can store transaction data associated with the client in a blockchain exclusively for the client and independent (or separate) from other clients in the centralized ledger system 400. The ledger server 420 can request and store trust timestamp information exclusively for the transaction data associated with the client stored in the blockchain in the ledger server 420. The client can have an administrative right for storing transactions in the blockchain. In some cases, the client can provide to a third party a secondary ledger right that allows the third party to store transactions in the blockchain associated with the client.

In some embodiments, when a transaction (or transaction data) associated with the client is stored in the ledger server 420, the client can use the client device 410 to transmit a client signature to the ledger server 420. The client signature can indicate that the client acknowledges that the transaction has been completed and/or is to be stored in the ledger server 420. Thus, the client cannot repudiate the transaction.

In some embodiments, after receiving and/or storing the transaction (or the transaction data) in the ledger server 420 (e.g., in a blockchain), the ledger server 420 can transmit a ledger signature to the client device 410. The ledger signature can indicate that the ledger server 420 acknowledges the receipt and/or storage of the transaction. Thus, the ledger server 420 cannot deny storing the transaction.

In some embodiments, the ledger server 420 can transmit to the trust time server 430 a timestamp request for transactions that are associated with the client and stored in the ledger server 420. The trust time server 430 can provide a timestamp and associated signature for the transactions to the ledger server 420. The timestamp signature can include information of the transactions. Thus, the trust time server 430 cannot deny that its endorsement of time of the transactions and the timestamps for the transactions are trustworthy.

In some embodiments, the three respective rights of the three parties (the client, the ledger server, and the trust time server) are independent from each other, which can enhance creditability and auditability of the transaction data stored in the centralized ledger system.

Figure 4B:
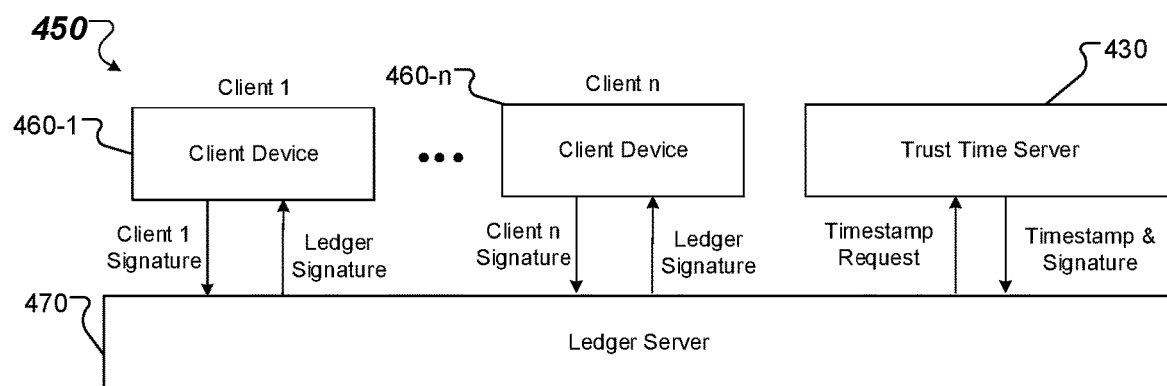
FIG. 4B is a diagram illustrating an example of a ledger system for providing a trust timestamp service to multiple clients by a joint ledger server in accordance with embodiments of this specification.

FIG. 4B is a diagram illustrating an example of a ledger system such as a blockchain-based centralized ledger system 450 for providing a trust timestamp service to multiple clients by a joint ledger server in accordance with embodiments of this specification. The blockchain-based centralized ledger system 450 can include a single joint ledger server 470 for providing a ledger service to multiple clients, client 1 to client n. The blockchain-based centralized ledger system 450 can be another example of the centralized ledger system 310 of FIG. 3. For example, the joint ledger server 470 can be an example of the ledger server 320 of FIG. 3. Each client, client 1 to client n, can be associated with a respective client device, 460-1 to 460-n. In some embodiments, the client devices 460-1 to 460-n can be examples of the client device 340-1 or 340-m of FIG. 3. Each client can use its respective client device 460 to access the ledger service provided by the ledger server 420, in the blockchain-based centralized ledger system 450. As an example, the clients can include multiple financial institutions such as customer banks.

Each client can use its associated client device to store transactions (or transaction data) in a joint blockchain shared with other clients. Similar to FIG. 4A, each client can transmit a respective client signature to the ledger server 470 and the ledger server 470 can return a corresponding ledger signature to the client. The ledger server 470 can transmit timestamp requests for the transactions stored in the joint blockchain to the trust time server 430 and receive and store timestamp information for the transactions in the joint blockchain.

Figure 5A:
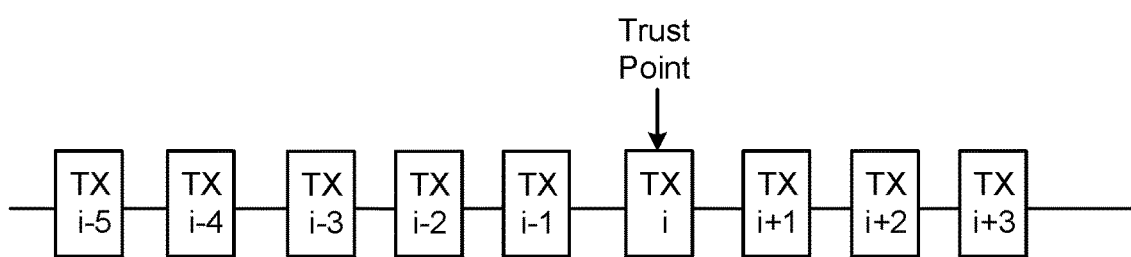
FIG. 5A is a diagram illustrating an example of a ledger system having trust points in accordance with embodiments of this specification.
Figure 5B:
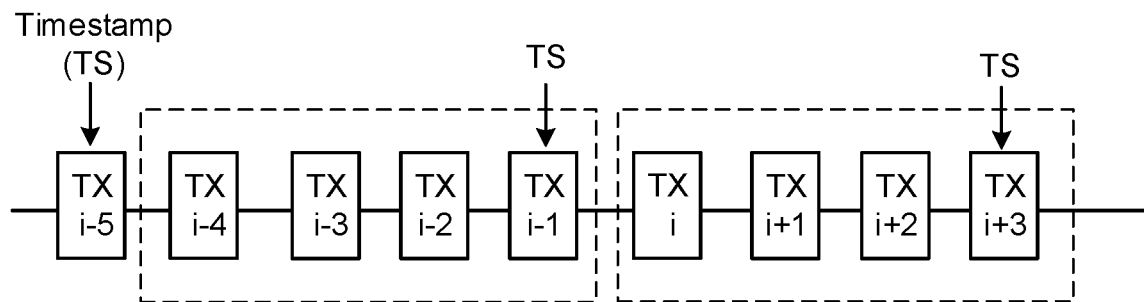
FIG. 5B is a diagram illustrating an example of a ledger system having trust timestamp information stored in transactions in accordance with embodiments of this specification.
Figure 5C:
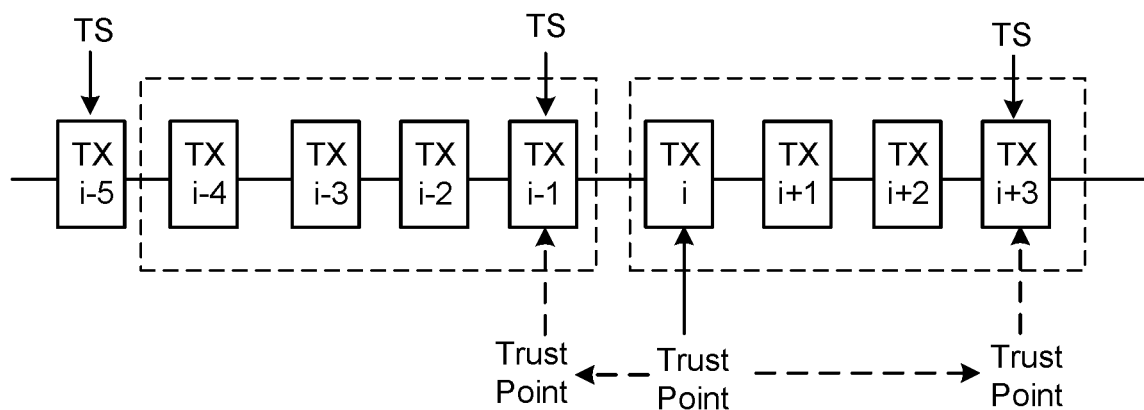
FIG. 5C is a diagram illustrating an example of a ledger system managing trust points on timestamp transactions in accordance with embodiments of this specification.

FIGS. 5A-5C are schematic diagrams illustrating an example of a ledger system for managing trust points in accordance with embodiments of this specification. The ledger system can be a blockchain-based ledger system, such as a consortium blockchain network 102 of FIG. 1 or 212 of FIG. 2, or the blockchain-based centralized ledger system 310 of FIG. 3, 400 of FIG. 4A, or 450 of FIG. 5B. The ledger system can be also a ledger system without blockchains. The ledger system stores a series of records. Each record can include a transaction in a ledger system or a block in a blockchain. For illustration purposes, a transaction is described as an example of a record.

As illustrated in FIG. 5A, a series of transactions (TX), e.g., TXi−5 to TXi+3 where i is an integer larger than 5, can be stored in the ledger system. Each transaction can have a respective transaction identifier, e.g., i for TXi, and can be sequentially added (or stored) in the series of transactions in the ledger system. The series of transactions can be stored in order in the ledger system according to the respective transaction identifiers. The transactions can be linked or anchored together. For example, each transaction can store information, e.g., a respective hash, of a preceding transaction immediately before the transaction, for example, for verifying trustworthiness of the preceding transaction.

In some embodiments, each transaction includes a transaction header and a transaction body. The transaction header can include a local timestamp, its own hash, and/or a hash of the immediately preceding transaction. The transaction body can include payload information of the transaction such as transfer participants, a transfer amount, and/or transfer time or place. The local timestamp indicates a time point or instance when the transaction is generated and/or added to the ledger system. The local timestamp can be internally provided by a server associated with the ledger system or a central trusted authority associated with the ledger system.

In some embodiments, the ledger system can establish trust points in the series of transactions. A trust point indicates that transactions before the trust point in the series of transactions are trustworthy. When a transaction in the series of transactions is to be verified, the ledger system can determine the transaction is trustworthily verified by tracing the transaction to an adjacent (e.g., a nearest) trust point preceding the transaction, without verifying transactions preceding the adjacent trust point in the series of transactions. For example, as illustrated in FIG. 5A, transaction TXi is a trust point established by the ledger system. When the ledger system verifies whether transaction TXi+3 is trustworthy, the ledger system may only need to verify whether transaction TXi+3 is trustworthily traceable back to the trust point TXi, without verifying whether transaction TXi+3 is trustworthily traceable back to TXi−1, TXi−2, . . . , TXi−5, or even earlier transactions in the series of transactions.

The ledger system can determine whether a specified transaction (e.g., a transaction under consideration or a transaction of interest) in the series of transactions is a trust point, for example, by verifying that the specified transaction can be trustworthily traceable to a preceding trust point. The preceding trust point can be a nearest trust point before the specified transaction in the series of transactions, any other preceding trust point before the specified transaction, or an original transaction that is a source for all the trust points in the series of transactions.

In some embodiments, the ledger system can verify that the specified transaction is trustworthily traceable to a trust point by verifying that the specified transaction includes information that is traceable to the trust point. The traceable information can include, for example, a hash of an immediately preceding transaction, a hash of a transaction identifier of the immediately preceding transaction, or any other type of information that can be used to verify the authenticity of the immediately preceding transaction. For example, the ledger system can verify each transaction from the specified transaction to the preceding trust point in the series of transactions includes a respective hash of a preceding transaction immediately before the transaction. Using the example in FIG. 5A, given that transaction TXi+3 is the specified transaction, the ledger system can verify that transaction TXi+3 is trustworthy by identifying a nearest trust point, transaction TXi, and verifying that transaction TXi+3 is trustworthily traceable back to transaction TXi+2, transaction TXi+2 is trustworthily traceable back to transaction TXi+1, and transaction TXi+1 is trustworthily traceable back to transaction TXi, but without verifying whether transaction TXi+3 is trustworthily traceable back to TXi−1, TXi−2, . . . , TXi−5, The verification can be performed forward, backward, or in both directions, for example, by tracing from the specified transaction back to the preceding trust point in the series of transactions or tracing from the preceding trust point forward to the specified transaction in the series of transactions.

In some embodiments, the ledger system can periodically establish trust points in the series of transactions with a time period, e.g., 1 hour, 1 day, 1 week, 1 month, or 1 year. The time period can be determined per client's request or needs. For example, the ledger system can provide trust point services with different costs corresponding to different time periods. The time period can be predetermined by a client (or a user) associated with the ledger system. The client can choose a trust point service with a respective time period corresponding to a respective cost.

In some embodiments, the ledger system may not establish trust points periodically. For example, the ledger system may establish a trust point on demand or based on the number of the transactions received by the ledger system. For example, the ledger system may receive a request from a client to determine whether a specified transaction is a trust point and/or establish a trust point on the specified transaction or on a transaction adjacent to the specified transaction. In some embodiments, the ledger system may also establish a new trust point upon receiving a predetermined number of transactions so that a trust point exists every the predetermined number of transactions.

In some embodiments, the ledger system can request trust timestamp information for the stored transactions from a trust time server. The trust time server is independent from the ledger system and can be associated with a third-party trust time authority that provides accurate time services and can be acknowledged or trusted, for example, globally, by the public, auditing entities (such as companies, institutions, or organizations), and/or legal entities (such as courts or governments). The trust time server can be, for example, the time server 350 of FIG. 3 or the time server 430 of FIGS. 4A-4B. As the trustworthiness of the timestamp information provided by the trust time server is acknowledged, integrating the timestamp information of the trust time server into the ledger system for the stored transactions can further enhance credibility, auditability, and legality of the transactions stored in the ledger system.

The ledger system can transmit a timestamp request to the trust time server. In some examples, the timestamp request includes an identifier of the timestamp request among multiple timestamp requests transmitted to the trust time server by the ledger system. In some examples, the timestamp request includes an identifier or a hash of the most recent transaction stored in the series of transactions. In some examples, multiple transactions can be considered as a unit or a group and the ledger system can request trust timestamp information for the transactions in the unit. The timestamp request can include a hash digest of hashes of the transactions in the unit.

After receiving trust timestamp information for the timestamp request, e.g., trust timestamp (TS) and associated signature, from the trust time server, the ledger system can store the trust timestamp information, for example, as a new transaction or be added to another transaction in the series of transactions. The new transaction can be linked or anchored to the series of transactions by storing a hash of the most recent transaction in the series of transactions. The new transaction storing the trust timestamp information can be labelled or marked as a new timestamp transaction in the series of transactions. The new timestamp transaction is stored immediately after the most recent transaction in the series of transactions.

In some embodiments, the ledger system can group multiple transactions in a unit and include a timestamp transaction as a last transaction in the unit. In some instances, the timestamp transaction can be considered as including the acknowledged trust timestamp information for all the transactions in the unit.

For example, as illustrated in FIG. 5B, transactions TXi−4, TXi−3, and TXi−2 are considered as a unit. In some embodiments, the ledger system can calculate hashes of the three transactions in the unit and generate a hash digest of the hashes. The ledger system can then send a timestamp request including the hash digest of the hashes of the transactions in the unit. After receiving trust timestamp and associated signature for the timestamp request, the ledger system stores the trust timestamp and associated signature in a new transaction TXi−1 that is stored immediately after the most recent transaction TXi−2. Transaction TXi−1 is a timestamp transaction that stores trust timestamp information from the trust time server. Transaction TXi−1 is included in the unit as the last transaction and linked to the transactions by storing a hash of an immediately preceding transaction TXi−2. In some embodiments, the timestamp transaction TXi−1 can also store a hash digest of hashes of the transactions in the unit, i.e., TXi−4, TXi−3, and TXi−2, and the transactions in the unit can be considered to have the same trust stamp as the timestamp transaction.

Similarly, transactions TXi, TXi+1, TXi+2 can be considered as a unit. The ledger system can obtain trust timestamp information for the unit from the trust time server and store the trust timestamp information in transaction TXi+3 that immediately follows TXi+2 in the series of transactions. Transaction TXi+3 is a new timestamp transaction and is included as a last transaction in the unit including the transactions TXi, TXi+1, and TXi+2.

In some embodiments, transactions between two adjacent timestamp transactions are considered to have trust timestamp same as the latter of the two adjacent timestamp transactions. The transactions and the latter timestamp transaction can be considered as a unit with the latter timestamp transaction as the last transaction in the unit.

In some embodiments, the ledger system can collect transactions stored in the series of transactions after a first timestamp transaction and transmit a timestamp request including information of the collected transactions, e.g., a hash digest of hashes of the collected transactions to the trust time server. After receiving trust timestamp and associated signature from the trust time server, the ledger system stores the trust timestamp and associated signature in a new transaction as a second timestamp transaction. The collected transactions after the first timestamp transaction can be considered to have a same trust timestamp as the second timestamp transaction. The collected transactions and the second timestamp transaction can be considered as a unit.

In some embodiments, the ledger system can periodically transmit a timestamp request to the trust time server with a triggering time period. The ledger system can include a timer counting a time after transmitting a first timestamp request. When the timer counts to the triggering time period, the ledger system can be triggered to transmit a second timestamp request to the trust time server.

In some embodiments, the ledger system may not transmit timestamp requests to the trust time server periodically. For example, the ledger system may transmit a timestamp request upon receiving instructions from a client, or upon a predetermined number of transactions have been recently added to the series of transactions after the previous timestamp request. For example, as illustrated in FIG. 5B, the ledger system can transmit a timestamp request for every three transactions, e.g., TXi−4, TXi−3, and TXi−2, or TXi, TXi+1, and TXi+2, and generate timestamp transactions, e.g., transactions TXi−5, TXi−1, and TXi+3, for the every three transactions.

FIG. 5C shows an example of a ledger system managing trust points on timestamp transactions in accordance with embodiments of this specification. In some embodiments, the ledger system may receive a request to establish a trust point for a specified transaction. The specified transaction may or may not be the trust point. In some embodiments, the ledger system may establish the specified transaction as a trust point if both conditions are satisfied: (1) the specified transaction is trustworthily traceable to another trust point in the series of transactions, and (2) the specialized transaction is a timestamp transaction that stores trust timestamp information from the trust time server. In some embodiments, the ledger system can first verify the two conditions in either order or in parallel. For example, the ledger system can verify that the specialized transaction is a trust point, for example, by verifying that the specialized transaction can be trustworthily traceable to another trust point, and then determine whether the specified transaction is a timestamp transaction. In some embodiments, the ledger system may first determine whether the specified transaction is a timestamp transaction, and then determine whether the specialized transaction can be trustworthily traceable to another trust point. If the ledger system determines that the specified transaction satisfies one of the two conditions, the ledger system can determine that the specified transaction is a candidate trust point. Only after the ledger system determines that the specified transaction satisfies both of the two conditions, the ledger system can determine that the specified transaction is a trust point.

In some embodiments, for determining whether a specified transaction is a timestamp transaction, the ledger system stores a table or another suitable data structure listing timestamp transactions in the series of transactions (e.g., by listing respective transaction identifiers). The ledger system can search the table to determine whether the specified transaction is in the list of timestamp transactions. In some embodiments, the ledger system can store information of units, e.g., transaction identifiers of transactions in each unit, in a table or another suitable data structure. The ledger system can determine whether the specified transaction is a timestamp transaction by determining the transaction identifier of the specified transaction is the last transaction identifier in a corresponding unit.

If the ledger system determines that the specified transaction is a timestamp transaction, the ledger system can mark the specified transaction as the trust point and establish the specified transaction as the trust point. The ledger system can also store a table or another suitable data structure listing trust points in the series of transactions.

If the ledger system determines that the specified transaction is not a timestamp transaction, the ledger system may not mark the specified transaction as the trust point. The ledger system can identify a timestamp transaction adjacent to the specified transaction and mark the timestamp transaction as the trust point for the specified transaction. The timestamp transaction adjacent to the specified transaction can be a timestamp transaction preceding or following the specified transaction. For example, the ledger system can identify an adjacent timestamp transaction by identifying a last transaction in a unit that includes the specified transaction to be the timestamp transaction, or by identifying a last transaction in a preceding unit immediately before the unit that includes the specified transaction to be the timestamp transaction. For example, as illustrated in FIG. 5C, after the ledger system determines that transaction TXi is a trust point but not a timestamp transaction, the ledger system can identify an adjacent timestamp transaction TXi+3 in the same unit as transaction TXi or an adjacent timestamp transaction TXi−1 in an immediately preceding unit.

In some embodiments, a timestamp transaction nearest to the specified transaction can be identified as a candidate trust point for the specified transaction. For example, the ledger system can identify an adjacent timestamp transaction among timestamp transactions in the series of transactions by identifying a timestamp transaction associated with a transaction identifier that is closest to a transaction identifier for the specified transaction.

After identifying the timestamp transaction adjacent to the specified transaction as the candidate trust point for the specified transaction, the ledger system further determines whether the timestamp transaction is trustworthily traceable to the specified transaction, for example, by determining whether the timestamp transaction includes information that is traceable to the specified transaction. In some embodiments, the ledger system determines that the timestamp transaction is trustworthily traceable to the specified transaction by verifying that each transaction from the timestamp transaction to the specified transaction in the series of transactions includes a respective hash of a preceding transaction immediately before the transaction. For example, as shown in FIG. 5C, to determine whether transaction TXi is trustworthily traceable to the timestamp transaction TXi−1, the ledger system can determine whether transaction TXi includes a hash of the timestamp transaction TXi−1, for example, in the header of transaction TXi. To determine whether the timestamp transaction TXi+3 is traceable to transaction TXi, the ledger system can verifying whether transaction TXi+3 includes a hash of transaction TXi+2, whether transaction TXi+2 includes a hash of transaction TXi+1, and whether transaction TXi+1 includes a hash of transaction TXi. In some embodiments, if a unit of multiple transactions is configured, the ledger system determines that the timestamp transaction is trustworthily traceable to the specified transaction by verifying that the timestamp transaction is the last transaction in the same unit as the specified transaction or the timestamp transaction is the last transaction in an immediately preceding unit.

If the ledger system determines that the timestamp transaction is trustworthily traceable to the specified transaction, the ledger system can mark the timestamp transaction, not the specified transaction, as the trust point for the specified transaction and establish the trust point on the timestamp transaction. If the ledger system determines that the timestamp transaction is not trustworthily traceable to the specified transaction, the ledger system can keep searching another adjacent timestamp transaction and repeat the above steps.

In some embodiments, the ledger system can store the series of transactions in a blockchain. For example, the ledger system can be the ledger system 310 of FIG. 3. The ledger system can include a ledger server, e.g., the ledger server 320 of FIG. 3, the ledger server 320 of FIG. 4A, or the ledger server 470 of FIG. 4B. As an example, the blockchain can be the blockchain 322 of FIG. 3. The ledger system can sequentially generate blocks storing the transactions in the blockchain. Each of the blocks can store one or more transactions. Each block can be linked or anchored together, for example, by storing a hash of a preceding block that is immediately before the block in the blockchain. The ledger system can generate the blocks in the blockchain periodically with a predetermined time period, or non-periodically (e.g., on demand or based on a predetermined number of transactions).

The generation of blocks by the ledger system can be independent from establishing trust points in the ledger system. The generation of blocks by the ledger system can be also independent from transmitting timestamp requests to the trust time server and/or generating timestamp transactions to be stored in the ledger system. That is, the generation of blocks can be independent from grouping units for obtaining trust timestamp information from the trust time server. For example, the ledger system can group transactions TXi−4, TXi−3, TXi−2, and TXi−1 as a unit, while the ledger system can generate a block storing transactions TXi−5, TXi−4, and TXi−3. In some embodiments, the generation of blocks can be associated with transmitting timestamp requests to the trust time server and generating timestamp transactions. For example, the ledger system can generate a block after generating a timestamp transaction for transactions in a unit, where the block stores the transactions in the unit and the timestamp transaction. As an example, the ledger system can generate a block storing transactions TXi−4, TXi−3, TXi−2, and TXi−1.

In some embodiments, a determination (or establishment) of a trust point by the ledger system can be independent from a transmission of a timestamp request and/or a generation of timestamp transaction. In some embodiments, a determination of a trust point by the ledger system can be associated with the transmission of a timestamp request and the generation of timestamp transaction. For example, the ledger system can first generate a timestamp transaction and then determine whether the timestamp transaction can be established as a trust point.

Figure 6:
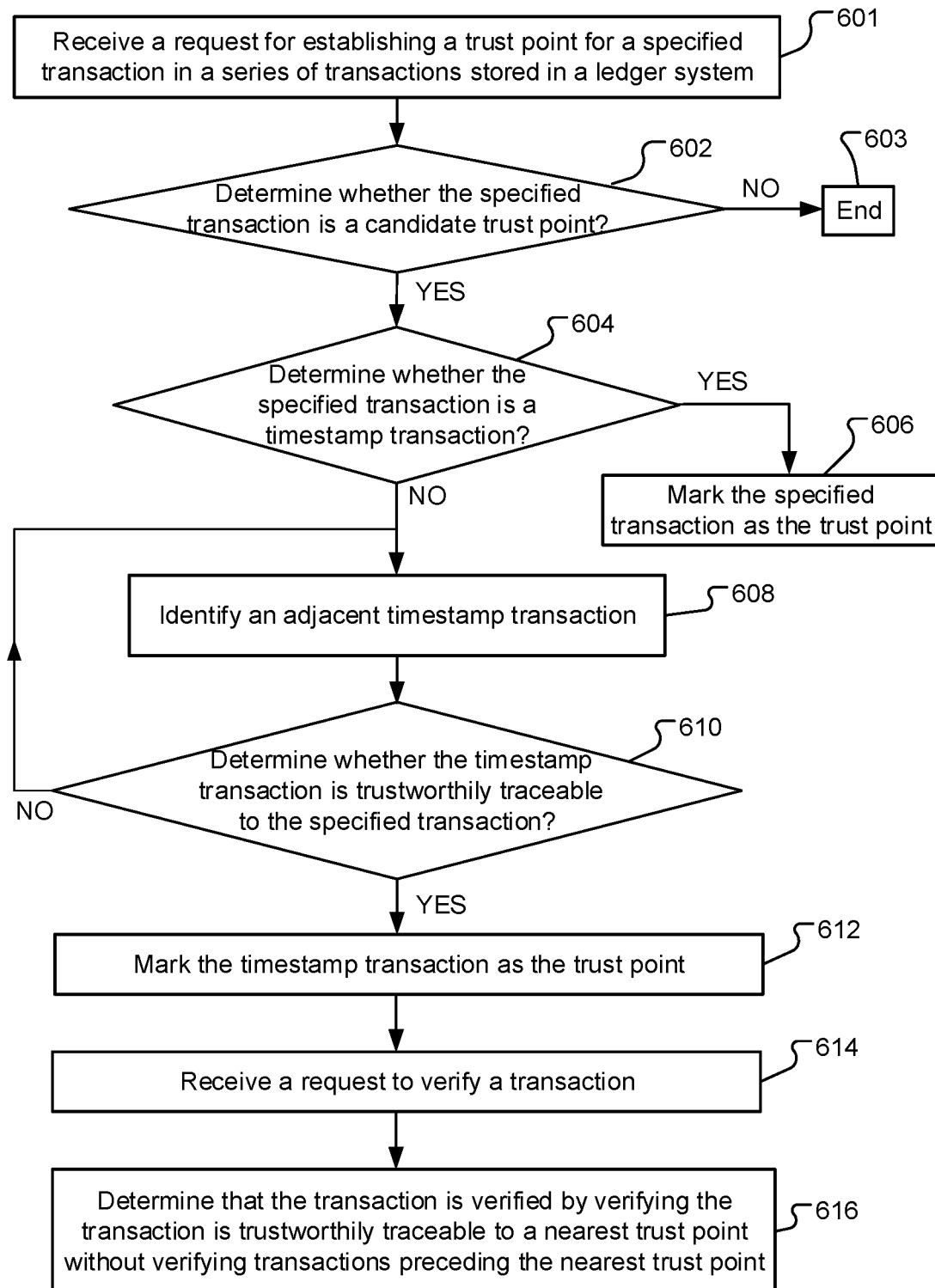
FIG. 6 is a flowchart illustrating an example of a process that can be executed in accordance with embodiments of this specification.

FIG. 6 is a flowchart illustrating an example of a process 600 for implementation of timestamp services that can be executed in accordance with embodiments of this specification. For convenience, the process 600 will be described as being performed by a system of one or more computers, located in one or more locations, and programmed appropriately in accordance with this specification. For example, a ledger system can perform the process 600. The ledger system can be a blockchain-based ledger system, such as a consortium blockchain network 102 of FIG. 1 or 212 of FIG. 2 or the blockchain-based centralized ledger system 310 of FIG. 3, or a ledger system without blockchains.

At 601, a request for establishing a trust point for a specified transaction in a series of transactions stored in the ledger system is obtained, for example, by a computing device in the ledger system. The specified transaction can be an identified transaction under consideration or of interest. For example, the specified transaction can be a latest transaction in the series of transactions. The specified transaction can be specified, for example, inputting an identifier of the specified transaction in a smart contract for calling the function of identifying a trust point for a specified transaction.

The trust point indicates that transactions before the trust point in the series of transactions are trustworthy. As such, verifying authenticity of a to-be-verified transaction in the series of transactions may only need to verify authenticity of transactions between the authenticity of the to-be-verified transaction and its nearest preceding trust point.

In some embodiments, each transaction in the series of transactions is associated with a respective transaction identifier, and the series of transactions are stored in order according to respective transaction identifiers. The series of transactions can be linked or anchored together by each transaction, for example, storing a respective hash of a preceding transaction that is immediately before the transaction in the series of transactions.

In some embodiments, the request for establishing a trust point can be an explicit request that is generated by a client on demand, or an implicit request upon a triggering event such as after elapse of a predetermined time period or receipt of a number of transactions.

In some embodiments, similar to what described with respect to FIG. 5C, the request for establishing a trust point for the specified transaction can require two conditions: (1) the specified transaction is trustworthily traceable to another trust point in the series of transactions, as described with respect to 602, and (2) the specialized transaction is trustworthily traceable to a timestamp transaction that stores trust timestamp information from the trust time server, as described with respect to 604 to 610. In some embodiments, the two conditions can be verified in either order or in parallel. If the ledger system determines that the specified transaction satisfies one of the two conditions, the ledger system can determine that the specified transaction is a candidate trust point. Only after the ledger system determines that the specified transaction satisfies both of the two conditions, the ledger system can determine that the specified transaction is a trust point.

At 602, whether the specified transaction is trustworthily traceable to another trust point is determined. In other words, whether the specified transaction itself is a candidate trust point is determined. In some embodiments, the ledger system determines whether the specified transaction is a candidate trust point, for example, by verifying whether each transaction from the specified transaction to the preceding trust point in the series of transactions includes a respective hash of a preceding transaction immediately before the transaction. The ledger system can verify whether the specified transaction is trustworthily traceable to the preceding trust point by at least one of tracing from the specified transaction back to the preceding trust point in the series of transactions or tracing from the preceding trust point to the specified transaction. The preceding trust point can be a trust point immediately before the specified transaction in the series of transactions or a first transaction (or an original transaction) that is a source for trust points in the series of transactions.

The ledger system can periodically establish trust points on transactions in the series of transactions. The ledger system can also establish a trust point on demand or according to a number of transactions added from an immediately preceding trust point. The ledger system can also verify per request whether a transaction in the series of transactions is a trust point.

In some embodiments, the ledger system stores the series of transactions in a blockchain that includes a plurality of blocks. Each of the blocks can store one or more transactions and is linked or anchored together by storing a hash of an immediately preceding block in the blockchain. The generation of blocks can be independent from the establishment of trust points or the determination of the specified transaction to be a trust point.

At 603, in response to determining that the specified transaction is not a candidate trust point, the process 600 ends. The ledger system can generate a message indicating that the specified transaction cannot be established as a trust point. The message can be transmitted back to a client device or be displayed on a screen.

At 604, in response to determining that the specified transaction is a candidate trust point, the ledger system determines whether the specified transaction is a timestamp transaction that stores trust timestamp information from a trust time server. The trust time server is independent from the ledger system and can be associated with a third party trust time authority.

In some embodiments, the ledger system can transmit a timestamp request to the trust time server. The timestamp request can include an identifier of timestamp request among timestamp requests transmitted to the trust time server. The timestamp request can include a transaction identifier or a hash of a most recent transaction in the series of transaction. The timestamp request can also include a hash digest of hashes of transactions in a unit. The unit collects the transactions stored in the series of transactions from an immediately preceding timestamp transaction.

After receiving a trust timestamp and associated signature for the timestamp request from the trust time server, the ledger system can store the trust timestamp and associated signature as a transaction in the series of transactions. The transaction storing the trust timestamp and associated signature from the trust time server can be marked as a new timestamp transaction. The new timestamp transaction can be stored immediately after the most recent transaction in the series of transactions when the timestamp request is transmitted. The new timestamp transaction can be linked to the series of transactions by storing a hash of the most recent transaction. In some embodiments, the new timestamp transaction can store a hash digest of hashes of transactions in the unit that includes the most recent transaction. The transactions in the unit can be considered to have the same trust timestamp as the new timestamp transaction. The new timestamp transaction can be included in the unit as the last transaction.

In some embodiments, the ledger system can periodically transmit timestamp requests to the trust time server with a predetermined triggering time period. The ledger system can also transmit timestamp requests to the trust time server non-periodically, e.g., on demand or based on a predetermined number of transactions collected after an immediately preceding timestamp request. The transmission of timestamp requests can be independent from the generation of blocks and/or the establishment of trust points.

At 606, in response to determining that the specified transaction is a timestamp transaction, the ledger system marks the specified transaction as the trust point, that is, the ledger system establishes the trust point on the specified transaction.

At 608, in response to determining that the specified transaction is not a timestamp transaction, the ledger system identifies a timestamp transaction that is adjacent to the specified transaction in the series of transactions. In some embodiments, the ledger system can identify the timestamp transaction by identifying a last transaction in a unit that includes the specified transaction to be the timestamp transaction or by identifying a last transaction in a preceding unit immediately before the unit that includes the specified transaction to be the timestamp transaction. In some embodiments, the ledger system stores a table listing transaction identifiers of timestamp transactions in the series of transactions. The ledger system can identify the timestamp transaction adjacent to the specified transaction by identifying a timestamp transaction associated with a transaction identifier that is closer to a transaction identifier of the specified transaction than any other transaction identifiers associated with any other timestamp transactions in the series of transactions.

At 610, the ledger system determines whether the timestamp transaction is trustworthily traceable to the specified transaction. In some embodiments, the ledger system can verify whether the timestamp transaction includes information of the specified transaction if the timestamp transaction follows the specified transaction in the series of transactions, or verify whether the specified transaction includes information of the timestamp transaction if the timestamp transaction precedes the specified transaction in the series of transactions. In some embodiments, the ledger system can verify whether each transaction from the timestamp transaction to the specified transaction in the series of transactions includes a respective hash of a preceding transaction immediately before the transaction. If the ledger system verifies that each transaction from the timestamp transaction to the specified transaction in the series of transactions includes a respective hash of a preceding transaction immediately before the transaction, the ledger system can determine that the timestamp transaction is trustworthily traceable to the specified transaction. If the ledger system cannot verify that each transaction from the timestamp transaction to the specified transaction in the series of transactions includes a respective hash of a preceding transaction immediately before the transaction, the ledger system can determine that the timestamp transaction is not trustworthily traceable to the specified transaction.

In response to determining that the timestamp transaction is not trustworthily traceable to the specified transaction, the process 600 goes back to step 608 and the ledger system can continue to identify an adjacent timestamp transaction that can be trustworthily traceable to the specified transaction.

At 612, in response to determining that the timestamp transaction is trustworthily traceable to the specified transaction, the ledger system marks the timestamp transaction as the trust point in the series of transactions. That is, the ledger system establishes the timestamp transaction as the trust point for the specified transaction.

At 614, the ledger system receives a request to verify a to-be-verified transaction in the series of transactions. For example, the request can be received from a client. The to-be-verified transaction can be of interest to the client. The to-be-verified transaction can be a transaction stored before or after the specified transaction in the series of transactions.

At 616, the ledger system determines that the transaction is verified by verifying that the transaction is trustworthily traceable to a nearest trust point before the transaction in the series of transactions. As the nearest trust point is trustworthy, determining that the transaction is verified does not need to verify transactions preceding the nearest trust point in the series of transactions. For example, if the to-be-verified transaction is a transaction after the specified transaction in the series of transactions, the ledger system can determine that the to-be-verified transaction is verified by verifying that the to-be-verified transaction is trustworthily traceable to the timestamp transaction that is marked as the trust point, without verifying transactions preceding the timestamp transaction in the series of transactions.

Figure 7:
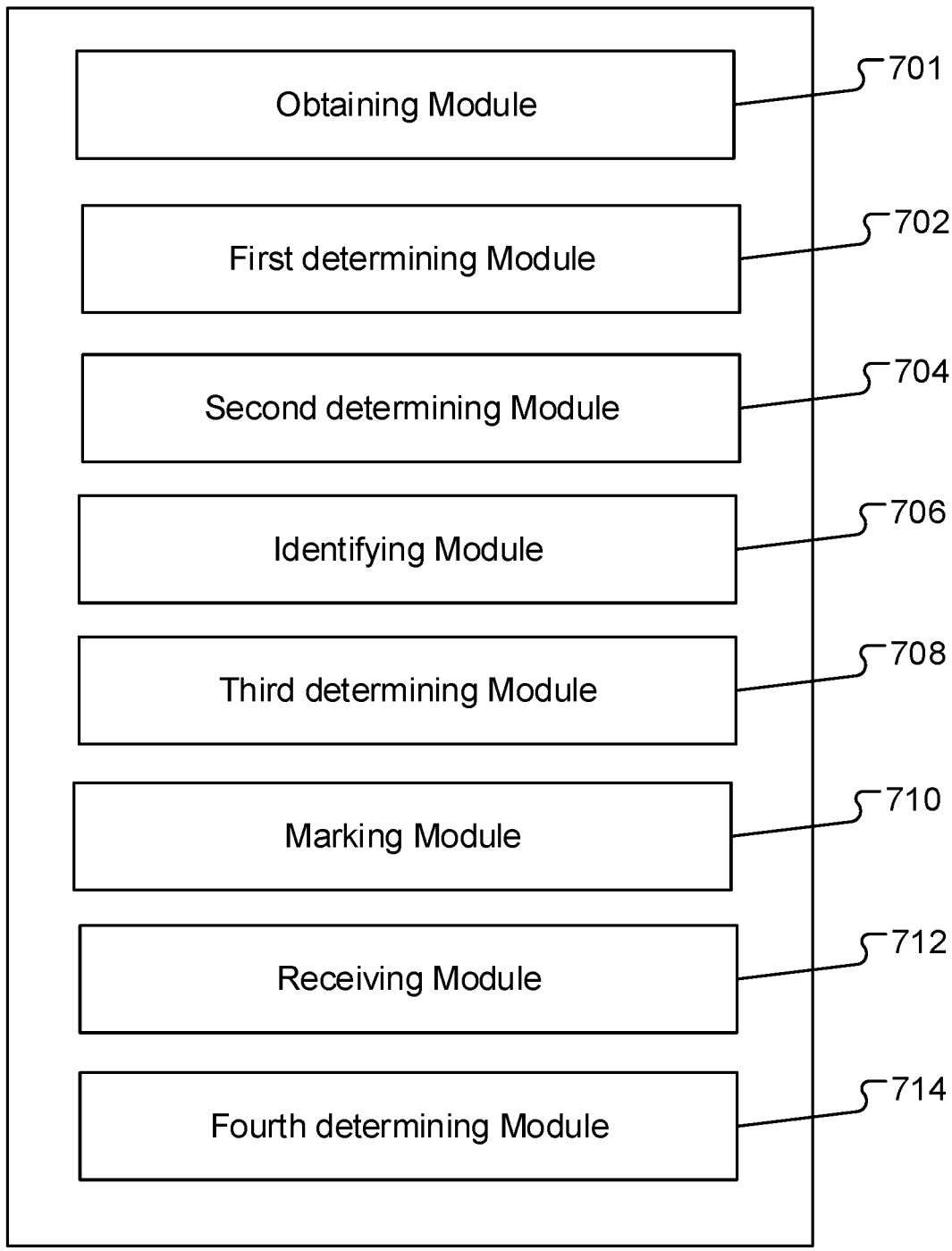
FIG. 7 depicts examples of modules of an apparatus in accordance with embodiments of this specification.

FIG. 7 depicts examples of modules of an apparatus 700 in accordance with embodiments of this specification. The apparatus 700 can be an example of an embodiment of a ledger system configured to provide ledger services, trust timestamp services, and trust point services for transaction data stored in the ledger system. The apparatus 700 can correspond to the embodiments described above, and the apparatus 700 includes the following: an obtaining module 701 that obtains a request for establishing a trust point for a specified record in a series of records stored in a ledger system by a computing device in the ledger system, the trust point indicating that records before the trust point in the series of records are trustworthy; a first determining module 702 that determines whether the specified record in a series of records stored in the ledger system is a candidate trust point; a second determining module 704 that determines whether the specified record is a timestamp record that includes trust timestamp information from a trust time server by the computing device, the trust time server being associated with a trust time authority and independent from the ledger system; an identifying module 706 that identifies a timestamp record that is adjacent to the specified record among timestamp records in the series of records in response to determining that the specified record is not a timestamp record; a third determining module 708 that determines whether the timestamp record is trustworthily traceable to the specified record by the computing device; and a marking module 710 that marks the timestamp record to be the trust point in the series of records in response to determining that the timestamp record is trustworthily traceable to the specified record.

In some embodiments, the apparatus 700 further includes a receiving module 712 that receives a request to verify a to-be-verified record in the series of records and a fourth determining module 714 that determines that the to-be-verified record is verified by determining the to-be-verified record is trustworthily traceable to a nearest trust point preceding the to-be-verified record without verifying records preceding the nearest trust point in the series of records. In some embodiments, one or more of the first determining module 702, the second determining module 704, the third determining module 708, and the fourth determining module 714 can be implemented as a single module.

In some embodiments, each record of the series of records includes a respective transaction. In some embodiments, each record of the series of records includes a respective block, and the series of records form a blockchain.

In some embodiments, each record of the series of records includes a respective hash of a preceding record immediately before the record in the series of record.

In some embodiments, the third determining module 708 is configured to determine that the timestamp record is trustworthily traceable to the specified record by at least one of: verifying that the timestamp record includes information that is traceable to the specified record authenticates the specified record or verifying the specified record includes information that is traceable to the timestamp record and authenticates the timestamp record.

In some embodiments, the third determining module 708 is configured to determine that the timestamp record is trustworthily traceable to the specified record by verifying that each record from the timestamp record to the specified record in the series of records includes a respective hash of a preceding record immediately before the record.

In some embodiments, the first determining module 702 is configured to determine that a specified record in a series of records is a trust point by verifying that the specified record is trustworthily traceable to a preceding trust point before the specified record in the series of records.

In some embodiments, the apparatus 700 includes a verifying module configured to verify that the specified record is trustworthily traceable to a preceding trust point before the specified record by verifying that each record from the specified record to the preceding trust point in the series of records includes a respective hash of a preceding record immediately before the record.

In some embodiments, the preceding trust point is one of a trust point immediately before the specified record in the series of records, and a first record that is a source for trust points in the series of records.

In optional embodiment, the verifying module is configured to verify that the specified record is trustworthily traceable to a preceding trust point before the specified record in the series of records by at least one of tracing from the specified record back to the preceding trust point in the series of records or tracing from the preceding trust point forward to the specified record in the series of records.

In some embodiments, the apparatus 700 further includes a transmitting module that transmits a timestamp request to the trust time server; a second receiving module that receives a trust timestamp and associated signature for the timestamp request from the trust time server; and a storing module that stores the trust timestamp and associated signature as a record in the series of records. The record storing the trust timestamp and associated signature from the trust time server is a new timestamp record in the series of records, and the new timestamp record is stored immediately after a most recent record stored in the series of records when the timestamp request is transmitted and includes a hash of the most recent record.

In some embodiments, records between the new timestamp record and a preceding timestamp record immediately before the new timestamp record in the series of records are grouped in a unit, and the new timestamp record is included as a last record in the unit.

In some embodiments, the timestamp request includes at least one of: an identifier of the timestamp request among timestamp requests transmitted to the trust time server, an identifier or a hash of the most recent record, or a hash digest of hashes of the records in the unit.

In some embodiments, the identifying module 706 is configured to identify the timestamp record by identifying a last record in a unit that includes the specified record to be the timestamp record or identifying a last record in a preceding unit immediately before the unit that includes the specified record to be the timestamp record.

In some embodiments, the first determining module 702 determines that a second record in the series of records is a second trust point, the second determining module 704 determines that the second record is a timestamp record in the series of records, and the marking module 710 marks the second record to be the second trust point in the series of records.

In some embodiments, the new timestamp record includes a hash digest of hashes of the records in the unit.

In some embodiments, the apparatus 700 further includes a transmitting module that periodically transmits timestamp requests to the trust time server with a predetermined time period for timestamp request.

In some embodiments, the apparatus 700 further includes a generating module that sequentially generates blocks storing the series of records in a blockchain, each of the blocks storing one or more records and being linked together in the blockchain. Generating the blocks in the blockchain is independent from determining that the specified record is the trust point and independent from transmitting a timestamp request to the trust time server.

In some embodiments, each record in the series of records is associated with a respective record identifier, and the series of records are stored in order according to respective record identifiers, and the identifying module 706 identifies a timestamp record that is adjacent to the specified record among timestamp records in the series of records by identifying a timestamp record associated with a record identifier that is closest to a record identifier for the specified record in the series of records.

In some embodiments, determining that the specified record in the series of records stored in the ledger system is the candidate trust point is independent from transmitting timestamp requests to the trust time server.

In some embodiments, the specified record is not marked as the trust point in the series of records in response to determining that the specified record is not a timestamp record that includes trust timestamp information from a trust time server.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 7, it can be interpreted as illustrating an internal functional module and a structure of a ledger implementation apparatus. The ledger implementation apparatus can be an example of a ledger system configured to provide ledger services, trust timestamp services and trust point services for records (e.g., transaction data) stored in the ledger system. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiment can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
receiving a verification request to verify a to-be-verified record in a series of records stored in a ledger system by a computing device, wherein the series of records comprise a plurality of trust points, each of the plurality of trust points indicating that records before the trust point in the series of records are trustworthy, wherein one of the trust points is trustworthily traceable to another one of the trust points in the series of records, wherein the series of records are divided into a plurality of units, each of the plurality of units includes a respective trust point as a last record in the each of the plurality of units, the to-be-verified record is in a unit between a first trust point and a second trust point in the series of records, the first trust point is immediately preceding the second trust point among the plurality of trust points, the second trust point is included as a last record in the unit, and each of the trust points is a timestamp record that comprises trust timestamp information from a trust time server, and wherein the trust time server is associated with a trust time authority and independent from the ledger system; and
determining that the to-be-verified record is verified by the computing device verifying that the to-be-verified record is trustworthily traceable to an adjacent trust point in the series of records, without verifying records preceding the adjacent trust point in the series of records wherein the adjacent trust point is one of:
the last record in the unit that includes the to-be-verified record, or
a last record in a preceding unit immediately before the unit that includes the to-be-verified record.

2. The method of claim 1, wherein each record of the series of records comprises at least one of
a respective transaction, or
a respective hash of a preceding record immediately before the record in the series of records.

3. The method of claim 1, wherein verifying that the to-be-verified record is trustworthily traceable to an adjacent trust point in the series of records comprises at least one of:

verifying that the to-be-verified record comprises information that is traceable to and authenticates the adjacent trust point,
verifying the adjacent trust point comprises information that is traceable to and authenticates the to-be-verified record, or
verifying that each record from the to-be-verified record to the adjacent trust point includes a respective hash of a preceding record immediately before the record.

4. The method of claim 1, wherein the adjacent trust point is one of:
a trust point immediately before the to-be-verified record in the series of records, or
a first record that is a source for the trust points in the series of records.

5. The method of claim 1, wherein verifying that the to-be-verified record is trustworthily traceable to an adjacent trust point in the series of records comprises at least one of:
tracing from the to-be-verified record backward to the adjacent trust point in the series of records, or
tracing from the adjacent trust point forward to the to-be-verified record in the series of records.

6. The method of claim 1, wherein the series of records comprise a plurality of timestamp records, each of the plurality of timestamp records comprising respective trust timestamp information from the trust time server.

7. The method of claim 6, further comprising:
transmitting a timestamp request to the trust time server;
receiving a trust timestamp and associated signature for the timestamp request from the trust time server; and
storing the trust timestamp and associated signature as a record in the series of records,
wherein the record storing the trust timestamp and associated signature from the trust time server is a new timestamp record in the series of records, and
wherein the new timestamp record is stored after a most recent record stored in the series of records when the timestamp request is transmitted and the new timestamp record comprises a hash of the most recent record.

8. The method of claim 7, wherein the timestamp request comprises at least one of:
an identifier of the timestamp request among timestamp requests transmitted to the trust time server,
an identifier or a hash of the most recent record, or
a hash digest of hashes of records in a unit associated with the timestamp request.

9. An apparatus for managing trust points in a ledger system, comprising:
one or more processors; and
one or more computer-readable devices coupled to the one or more processors and having tangible, non-transitory, machine-readable media storing one or more instructions that, when executed by the one or more processors, perform operations comprising:
receiving a verification request to verify a to-be-verified record in a series of records stored in a ledger system, wherein the series of records comprise a plurality of trust points, each of the plurality of trust points indicating that records before the trust point in the series of records are trustworthy, wherein one of the trust points is trustworthily traceable to another one of the trust points in the series of records, wherein the series of records are divided into a plurality of units, each of the plurality of units includes a respective trust point as a last record in the each of the plurality of units, the to-be-verified record is in a unit between a first trust point and a second trust point in the series of records, the first trust point is immediately preceding the second trust point among the plurality of trust points, the second trust point is included as a last record in the unit, and each of the trust points is a timestamp record that comprises trust timestamp information from a trust time server, and wherein the trust time server is associated with a trust time authority and independent from the ledger system; and
determining that the to-be-verified record is verified by verifying that the to-be-verified record is trustworthily traceable to an adjacent trust point in the series of records, without verifying records preceding the adjacent trust point in the series of records, wherein the adjacent trust point is one of:
the last record in the unit that includes the to-be-verified record, or
a last record in a preceding unit immediately before the unit that includes the to-be-verified record.

10. The apparatus of claim 9, wherein each record of the series of records comprises at least one of:
a respective transaction, or
a respective hash of a preceding record immediately before the record in the series of records.

11. The apparatus of claim 9, wherein verifying that the to-be-verified record is trustworthily traceable to an adjacent trust point in the series of records comprises at least one of
verifying that the to-be-verified record comprises information that is traceable to and authenticates the adjacent trust point,
verifying the adjacent trust point comprises information that is traceable to and authenticates the to-be-verified record, or
verifying that each record from the to-be-verified record to the adjacent trust point includes a respective hash of a preceding record immediately before the record.

12. The apparatus of claim 9, wherein the adjacent trust point is one of:
a trust point immediately before the to-be-verified record in the series of records, or
a first record that is a source for the trust points in the series of records.

13. The apparatus of claim 9, wherein verifying that the to-be-verified record is trustworthily traceable to an adjacent trust point in the series of records comprises at least one of:
tracing from the to-be-verified record backward to the adjacent trust point in the series of records, or
tracing from the adjacent trust point forward to the to-be-verified record in the series of records.

14. The apparatus of claim 9, wherein the series of records comprise a plurality of timestamp records, each of the plurality of timestamp records comprising respective trust timestamp information from the trust time server.

15. The apparatus of claim 14, wherein the operations further comprise:
transmitting a timestamp request to the trust time server;
receiving a trust timestamp and associated signature for the timestamp request from the trust time server; and
storing the trust timestamp and associated signature as a record in the series of records,
wherein the record storing the trust timestamp and associated signature from the trust time server is a new timestamp record in the series of records, and
wherein the new timestamp record is stored after a most recent record stored in the series of records when the timestamp request is transmitted and the new timestamp record comprises a hash of the most recent record.

16. The apparatus of claim 15, wherein the timestamp request comprises at least one of:
an identifier of the timestamp request among timestamp requests transmitted to the trust time server,
an identifier or a hash of the most recent record, or
a hash digest of hashes of records in a unit associated with the timestamp request.

17. A non-transitory, computer-readable medium storing one or more instructions executable by a computer device to perform operations comprising:
receiving a verification request to verify a to-be-verified record in a series of records stored in a ledger system, wherein the series of records comprise a plurality of trust points, each of the plurality of trust points indicating that records before the trust point in the series of records are trustworthy, wherein one of the trust points is trustworthily traceable to another one of the trust points in the series of records, wherein the series of records are divided into a plurality of units, each of the plurality of units includes a respective trust point as a last record in the each of the plurality of units, the to-be-verified record is in a unit between a first trust point and a second trust point in the series of records, the first trust point is immediately preceding the second trust point among the plurality of trust points, the second trust point is included as a last record in the unit, and each of the trust points is a timestamp record that comprises trust timestamp information from a trust time server, and wherein the trust time server is associated with a trust time authority and independent from the ledger system; and
determining that the to-be-verified record is verified by verifying that the to-be-verified record is trustworthily traceable to an adjacent trust point in the series of records, without verifying records preceding the adjacent trust point in the series of records, wherein the adjacent trust point is one of:
the last record in the unit that includes the to-be-verified record, or
a last record in a preceding unit immediately before the unit that includes the to-be-verified record.

18. The non-transitory, computer-readable medium of claim 17, wherein each record of the series of records comprises at least one of:
a respective transaction, or
a respective hash of a preceding record immediately before the record in the series of records.

19. The non-transitory, computer-readable medium of claim 17, wherein verifying that the to-be-verified record is trustworthily traceable to an adjacent trust point in the series of records comprises at least one of
verifying that the to-be-verified record comprises information that is traceable to and authenticates the adjacent trust point,
verifying the adjacent trust point comprises information that is traceable to and authenticates the to-be-verified record, or
verifying that each record from the to-be-verified record to the adjacent trust point includes a respective hash of a preceding record immediately before the record.

20. The non-transitory, computer-readable medium of claim 17, wherein the adjacent trust point is one of:
a trust point immediately before the to-be-verified record in the series of records, or
a first record that is a source for the trust points in the series of records.

* * * * *

UNITED STATES PATENT AND TRADEMARK OFFICE
CERTIFICATE OF CORRECTION

| | |
|---|---|
| PATENT NO. | : 11,314,731 B2 |
| APPLICATION NO. | : 17/322519 |
| DATED | : April 26, 2022 |
| INVENTOR(S) | : Guan et al. |

It is certified that error appears in the above-identified patent and that said Letters Patent is hereby corrected as shown below:

In the Claims

Column 34, Line 55, in Claim 1, delete "records" and insert -- records, --.

Signed and Sealed this
Twelfth Day of July, 2022

Katherine Kelly Vidal
Director of the United States Patent and Trademark Office